(12) United States Patent
Bayer

(10) Patent No.: US 6,381,596 B1
(45) Date of Patent: Apr. 30, 2002

(54) DATABASE SYSTEM AND METHOD FOR OPERATING A DATABASE SYSTEM

(76) Inventor: Rudolf Bayer, Riegseestrasse 12, D-82194, Grobenzell (DE)

( * ) Notice: Subject to any disclaimer, the term of this patent is extended or adjusted under 35 U.S.C. 154(b) by 0 days.

(21) Appl. No.: 09/367,701

(22) PCT Filed: Mar. 6, 1998

(86) PCT No.: PCT/EP98/01330

§ 371 Date: Aug. 20, 1999

§ 102(e) Date: Aug. 20, 1999

(87) PCT Pub. No.: WO98/39712

PCT Pub. Date: Sep. 11, 1998

(30) Foreign Application Priority Data

Mar. 6, 1997 (DE) .......................................... 197 09 041

(51) Int. Cl.[7] .............................................. G06F 17/30
(52) U.S. Cl. ...................... 707/4; 707/1; 707/2; 707/3; 707/10
(58) Field of Search ............................... 707/1–3, 4–10

(56) References Cited

U.S. PATENT DOCUMENTS

| | | | |
|---|---|---|---|
| 4,468,728 A | | 8/1984 | Wang |
| 5,121,493 A | * | 6/1992 | Ferguson ........................ 707/7 |
| 5,404,505 A | * | 4/1995 | Lesinson ...................... 707/10 |
| 5,404,512 A | * | 4/1995 | Powers et al. .................. 707/3 |
| 5,404,513 A | * | 4/1995 | Powers et al. ............... 707/102 |
| 5,701,467 A | * | 12/1997 | Freeston ...................... 707/100 |
| 5,752,243 A | * | 5/1998 | Reiter et al. .................... 707/3 |

FOREIGN PATENT DOCUMENTS

| | | | |
|---|---|---|---|
| DE | 3908684 | 9/1990 | |
| EP | 0306197 | 8/1988 | ........... G06F/15/40 |
| EP | WO 95/02222 | 1/1995 | ........... G06F/17/30 |

OTHER PUBLICATIONS

Rudolf Bayer, The Universal B–Tree for multidemsional Indexing, TUM–19637, Sep. 1996.*

"Adaptive Join Algorithm", IBM Technical Disclosure Bulletin, vol. 33 No. 1B Jun. 1990, pp. 243–247.

* cited by examiner

Primary Examiner—Paul R. Lintz
Assistant Examiner—Debbie Le
(74) Attorney, Agent, or Firm—Shlesinger, Arkwright & Garvey LLP

(57) ABSTRACT

The invention relates to a database system comprising a computing unit, a main memory and a, in particular a peripheral memory storing at least one multi-dimensional stock of data in the form of a UB tree, further the invention relates to methods to run a database of this kind to read data and to implement join operations and further relational algebra operations, and sub-dividing the UB tree into a predetermined number of sub-spaces and consecutively processing the sub-spaces to read and ready the stock of data. Advantageously a cache storage buffers the regions (jump regions) of the UB tree cutting the sub-space being processed until the jump region(s) has (have) been completely processed in the subsequent sub-spaces.

11 Claims, 2 Drawing Sheets

DATABASE SYSTEM AND METHOD FOR OPERATING A DATABASE SYSTEM

The invention relates to a database system comprising a computer unit, an operational memory and a separate peripheral memory, storing at least one multi-dimensional stock of data in the form of a UB tree, further to a method for operating a database system of this kind to read data and to carry out join operations and further relational-algebra operations.

Databases for description, storage and retrieval of comprehensive stocks of data are known. A database system typically includes in particular a peripheral memory (data base) wherein the stock(s) of data are deposited, and a data management storing the data according to predetermined rules, or retrieving them or performing further operations with the data.

The so-called relational or join operations are operations frequently carried out, in particular in the field of relational databases, wherein at least two stocks of data, called relations, are connected in attribute-oriented manner. Most one-place and two-place operations carried out in databases require the presence of the operand(s) in sorting order of specific attributes. As a result, in the known databases, stored stocks of data must be sorted very frequently and the data must be moved several times between the computer's main memory and the hard disk or the peripheral memory. As regards multi-dimensional stocks of data in particular, such features entail storing and sorting processes which are costly in capacity and computer time.

In the light of the above state of the art, it is the objective of the present invention to create a database system as well as a method to operate a database system allowing reading, retrieving and joining stocks of data in arbitrary sorting sequence at minimized memory capacity and computer time.

This problem is solved by the invention by a database system having the features of claim 1. By storing the multi-dimensional stock of data as a UB (universal B) tree and by subdividing the UB tree into a predetermined number of sub-spaces and by consecutively processing the sub-spaces, the invention avoids re-sorting with respect to an inquiry attribute.

Organizing and storing a multi-dimensional stock of data in the form of a UB tree to achieve improved access time in particular for online applications together with the ability to dynamically insert and erase data objects is known from the German patent application 196 35 429.3 by the same applicant and also from "The Universal B-Tree for Multidimensional Indexing" by Rudolf Bayer at the Technical University of Munich, Institute of Information Theory, TUM-I9637, November 1996. Indexing and storing a multi-dimensional stock of data are carried out by bounding the stock of data in the form of a multi-dimensional cube subdivided by iterated subdivision in all dimensions into sub-cubes until consecutive sub-cubes can be consolidated into regions each containing a quantity of data objects that can be stored on a memory page of given storage capacity of the storage medium.

If now such a UB tree is sub-divided into a predetermined number of sub-spaces for the purpose of reading, retrieving and/or joining data, then, in the invention, the stored data can be processed by consecutively processing the sub-spaces in the direction of one dimension of the multi-dimensional stock of data without requiring sorting relative to a particular attribute in the peripheral memory.

The invention provides a cache storage to buffer the intersection regions of the sub-space being processed, i.e. the jump regions of the UB tree, until the jump region(s) in the subsequent sub-spaces have been completely processed. This feature offers the further advantage in that, on account of the buffering of the invention in a cache storage, each region need be retrieved only once from the UB tree, and in that regions (jump regions) projecting from the sub-space being processed can be buffered in one or more subsequent sub-spaces until they shall be completely processed. Either the whole jump region can be buffered or only that part of the jump region which projects from the sub-space being processed.

In a further implementation of the invention, a control system emits by default the number and/or the width of the sub-spaces. Such a control system can determine and emit by default the number and/or the width of the individual sub-spaces of a given UB tree. This feature allows optimal sub-division of the UB tree awaiting processing. Advantageously the control system is part of the computer system of the database system.

In the invention, the default of sub-space width is implemented as a minimizing function of the storing capacity of the cache storage. The stock of data stored as the UB tree therefore is subdivided to attain minimal storing capacity of the cache storage.

In another implementation of the invention, the above sub-division is into sub-spaces of equal widths. This feature facilitates consecutive processing of the data sub-chambers and especially processing buffered jump regions or portions of jump regions.

The invention furthermore proposes a method for operating a database system whereby the following stages are provided to read data in an arbitrary sorting sequence:

1. Sub-division of a multi-dimensional stock of data stored as a UB tree into a predetermined number of n sub-spaces,
2. Input of the data of the first sub-space of the UB tree into a main memory,
3. Processing (sorting and/or readying) the data of the sub-space, region by region,
4. Erasing those regions in the main memory that lack cut sets with subsequent sub-spaces,
5. Buffering those regions in a cache storage comprising at least one cut set with one of the subsequent sub-spaces (jump regions),
6. Input of next sub-space of the stock of data into the main memory,
7. Repeating the method steps 3 through 6 until the last sub-space has been processed, where, with respect to each new sub-space, first the jump regions buffered in the cache storage are processed and, unless they cut still further sub-spaces, they will be erased.

The method of the invention makes possible reading and keeping ready data from a multi-dimensional stock of data stored in the form of a UB tree in an arbitrary sorting sequence without requiring pre-sorting or re-sorting. In particular each datum object of the UB tree is fed only once in the method of the invention into the main memory of the database system.

In an especially advantageous solution offered by the invention of the above basic problems, a method is proposed to implement a join operation between two join partners, of which at least one join partner is a multi-dimensional stock of data stored as a UB tree, and comprising the following stages:

1. Subdividing the join partners into n sub-spaces,
2a. Input of the data of the first sub-space of a first join partner into a main memory, 2b. Input of the data of the first region of the first sub-space of a second join partner stored in the form of a UB tree, 3. Processing (finding and assigning) the data of the join partners present in the main memory, 4. Erasing the region in the main memory if this region lacks a cut set with at least one of the subsequent sub-spaces of the UB tree, otherwise buffering the region (jump region) in a cache storage, 5. Input of the next region of the second join partner into the main memory, 6. Repeating the method stages 3 through 5 until the last region of the first sub-space of the second join partner has been processed, 7. Input of the next sub-space of the first join partner and input per region of the next sub-space of the second join partner, 8. Repeating the method stages 3 through 7 until the last sub-space has been processed, where, for each new sub-space, first the buffered jump regions in the cache storage are processed and, if they no longer cut further sub-chambers, they will be erased.

In the invention therefore, two join partners are sub-divided each into a predetermined number n of sub-spaces by sub-dividing both join partners and then are joined to each other by successive assignments of the data in the sub-spaces without requiring pre-sorting or re-sorting of either or both join partners. In this invention, there is regional input of the sub-space of the join partner stored as a UB tree and to be processed, and the data objects contained in the region are processed by being assigned to the data objects of the corresponding sub-space of the join partner of the UB tree and then are erased if lacking a cut set with at least one of the ensuing sub-spaces of the UB tree. Otherwise the region will be buffered as a jump region in a cache storage. As regards each sub-space which is new in the sequence of processing, first the jump regions buffered in the cache storage will be processed and then erased unless they still cut further sub-spaces.

The method of the invention implementing a join operation is applicable to more than two join partners, each further join partner being sub-divided in the same way into a predetermined number n of sub-spaces and being consecutively processed in an appropriate direction by assigning the data objects of one region not only to one join partner but consecutively to several join partners while carrying out any appropriate join operations.

The invention is elucidated further below by means of illustrative embodiments schematically shown in the drawings.

FIGS. 1a through 1c show a three-dimensional stock of data F, with attributes A, B, C, which is organized as a UB tree in such manner that the multi-dimensional index is applied over the attributes A, B and C. Illustratively the attributes A, B and C may be the attributes "name", "zip code" and "fax number".

The following combinations are feasible sorting orders for the three attributes A, B, C:

| ABC | BAC | CAB |
|-----|-----|-----|
| ACB | BCA | CBA |
| AB  | BA  | CA  |
| AC  | BC  | CB  |
| A   | B   | C   | namely a total of 15 different sorting orders.

For a multi-dimensional UB tree of dimension d, there will be in general $$d! + d*(d-1)* \ldots *2 + \ldots + d*(d-1) \ldots *i + \ldots + d*(d-1) + d$$

feasible sorting orders [for d=3 there will be 3!+3*2+2=15].

To carry out the method of the invention, hereafter called "UB cache method", the stock of data F is subdivided in one dimension into a predetermined number n of sub-spaces. If, in the three-dimensional illustrative embodiment shown in FIGS. 1a–1c, data reading or processing is to be carried out in a sorting sequence relating to the attribute C, then the stock of data F will be sub-divided into n sub-spaces in the dimension of the attribute C (see FIG. 1a).

Figure 1A:
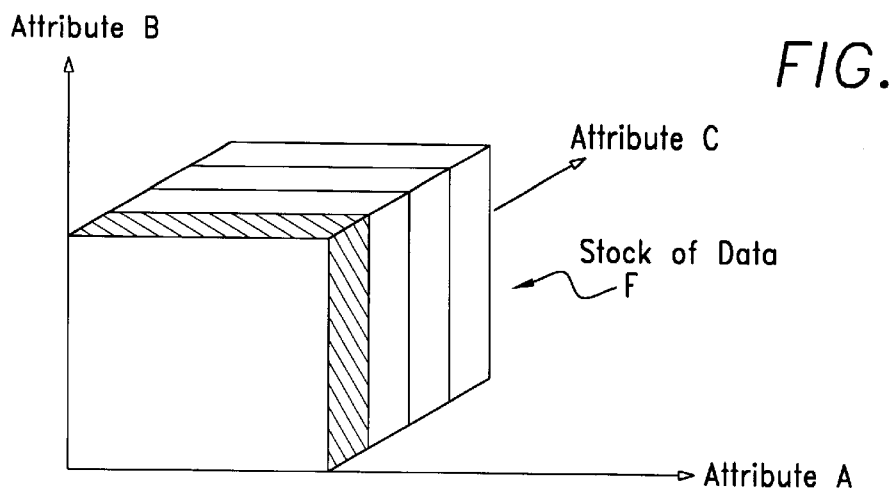
FIGS. 1a–1c show the method of the invention to read data in arbitrary sorting sequence using a three-dimensional UB tree data stock.
Figure 1B:
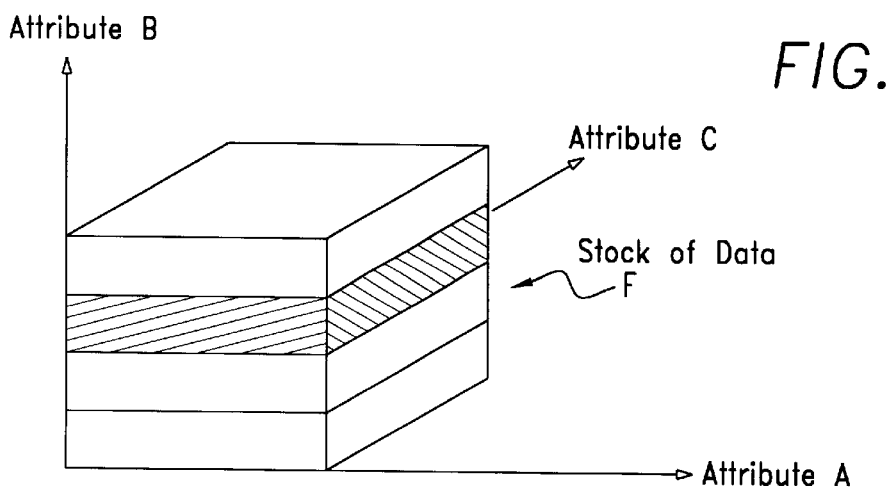
Figure 1C:
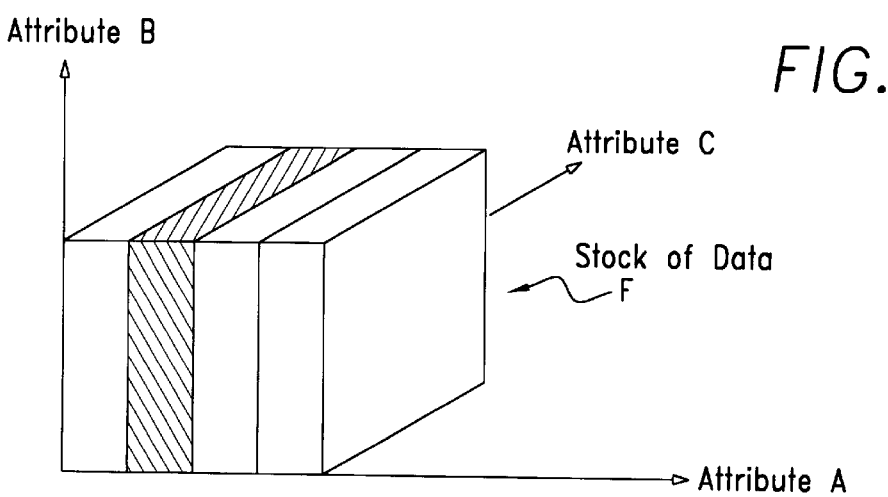

If however the stock of data shall be read or processed relative to the attribute B, then a sub-division into n sub-spaces will be carried out in the dimension of the attribute B (FIG. 1b). FIG. 1c shows the corresponding case for a sub-division into n sub-spaces of the stock of data F in the dimension of the attribute A.

The stock of data shall be sub-divided by preferably equidistant hyper planes, one segment of the stock of data between two consecutive hyper planes forming one data sub-space (=multi-dimensional slab). In the two-dimensional case (FIG. 2), the data sub-spaces are rows and columns.

In the example of the stock of data shown in FIG. 1a, subdivision is implemented by consecutive hyper planes of the form C=j/n*c in slabs of width 1/n, the so-called C slabs.

The ith slab then contains precisely those data which satisfy the following relation for the C attribute $$(i-1)*c/n <= C < i*c/n$$

where the attribute C may assume values between 0 and a given number c.

If the data in the above space shall be assorted with respect to the attribute A, the procedure is as follows:

for j:=1 to n do
  sort the data in the jth slab and
    output these data in sorting sequence.

This row by row processing works because in the sorting order of the attribute A all data in the first slab precede all data in the $2^{nd}$ slab and in general all data in the jth slab precede the data in the (j+1)th slab.

During such consecutive processing, the slabs are processed in rows. Illustratively FIG. 1a shows in shaded manner the first slab relating to attribute C, while FIG. 1b correspondingly shows the third slab relating to attribute B and FIG. 1c the second slab relating to attribute A.

The number n of slabs satisfies the condition $n=2^k$, where $k \geq 0$, and where k is a measure of the subdivision of the data space. Following k-fold subdivision of a data space of edge length 1, sub-cubes of side length 1/n will result.

Figures 2, 3:
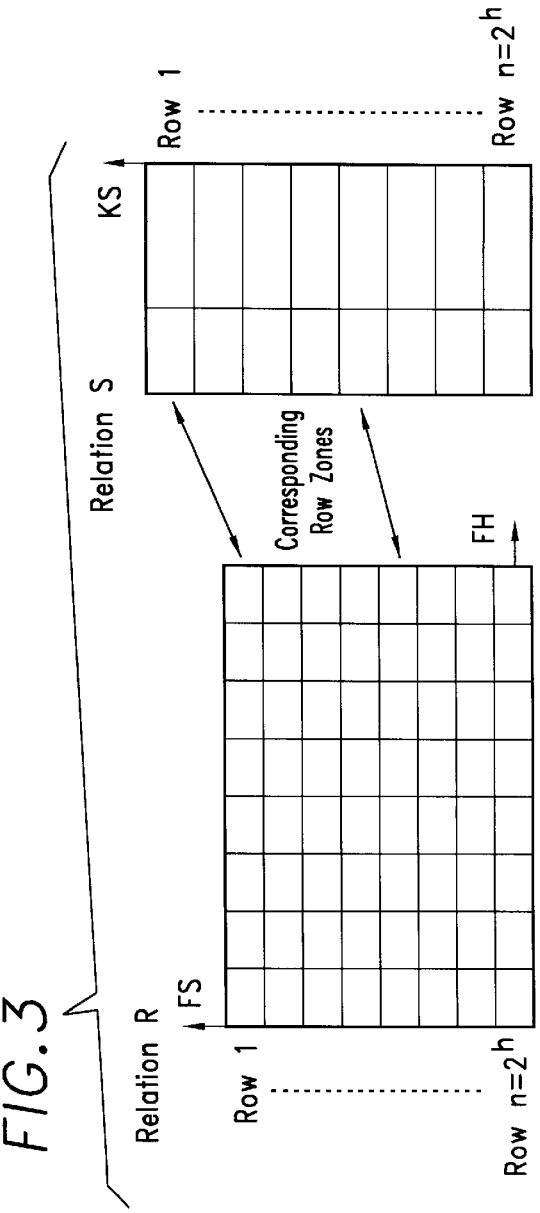
FIG. 2 illustrates processing and buffering jump regions by means of a two-dimensional UB tree data stock.
FIG. 3 shows a join operation of the invention between two relations R and S, each being two-dimensional.

FIG. 2 shows a UB tree for a two-dimensional stock of data with regions 01, 023, 101, 12, 131, 201, 221, 301, 32, 331 and 4 (ad infinitum) where, for the sake of simplicity the region is denoted by the upper limit of its address. Following k=3 sub-division, this stock of data has been subdivided into minimal, i.e. sub-squares of edge length 1/n with n=8.

In general a sub-cube is so overlapped by the regions of the UB tree that there will be a first region cutting the cube though it may not be wholly contained in it. Such a region is called a jump region because it is penetrating the sub-cubes from the outside. Then the sub-cube is filled by further regions as far as the last region which need not be wholly contained in the sub-cube and jumps out of it. This last region also is a jump region. Independently of the plane of subdivision, there may be at most two jump regions per sub-cube on a given plane of subdivision of the k-fold sub-divided stock of data.

To carry out the method of the invention, the illustrative embodiment of a two-dimensional stock of data shown in FIG. 2 is sub-divided into $n=2^3=8$ rows (horizontal, two-dimensional slabs).

When reading or processing the data objects contained in the stock of data, the data contained in row 1 are read first by region. If a region is not wholly contained in row 1, then a jump region is involved which together with at least another row forms cut sets. Those data objects of the jump region which are outside the row being processed are buffered according to the invention until the jump region has been completely processed in the ensuing rows. Accordingly the particular row j is considered being the query box FZ(j) to read the data and those regions which cut FZ(j) are entered from the peripheral memory into a buffer illustratively part of the main memory and are internally sorted in said buffer. The FZ(j) data can be immediately processed further, while the data from jump regions outside FZ(j) will be buffered for later processing.

In the example of FIG. 2, the following jump regions exist for each row,

```
row 1:01        023      101     12
row 2:          023      101
row 3:          023      101     131     201
row 4:                                   201
row 5:221       301      32
row 6:221       (301)
row 7:          301      331             infinite
row 8: no longer any jump function,
``` where each region is denoted by the higher of its two addresses. This example shows the jump regions per row and the particular contents of the buffer (hereafter UB buffer). At the same time, one may conclude that it is pessimistic to estimate that, of the possible jump regions, there are two jump regions per sub-cube. In the shown embodiment up to 16 jump regions might arise per row ($n=2^3=8$ sub-cubes each with up to 2 jump regions), actually however only 4 jump regions occurring per row.

Accordingly the row 1 of FIG. 2 is cut by the regions 01, 023, 101 and 12. Each of these regions therefore constitutes a jump region relative to row 1 and at least the portion of the data objects of each region not in row 1 will be buffered. Row 2 also is cut by the regions 01, 023, 101 and 12. However, the two regions 01 and 12 only jumping into the row 2, without jumping out of it again, they will be fully processed together with their data objects buffered in the UB buffer within the framework of row 2, and accordingly the two regions 023 and 101 remain in the UB buffer as being regions to be buffered therein further, which jump out of the row 2 and form further cut sets with the rows 3 and 4.

Row 6 is didactic, meeting only the jump region 221 (region 32 is completely processed within the scope of row 6), while the bracketed region 301 remains in the UB buffer for later processing within the scope of row 7.

If the two-dimensional stock of data shown in FIG. 2 shall not be read in the sorting sequence of the vertical attribute not further specified, but instead shall be read in the sorting sequence of the horizontal attribute, there takes place sub-division not into rows, but into columns, and the regions are not read by rows but by columns. In the general d-dimensional case, the rows or columns are replaced by slabs separated from each other by hyper planes.

Accordingly the UB cache method of the invention serves to process a given data space slab-by-slab, to buffer the projecting jump regions and to optimally control data transports.

Essentially the method of the invention is composed of two components, namely the so-called UB buffer and the so-called UB control. Advantageously the UB buffer is part of the main memory and is used to buffer jump regions or parts of jump regions for later processing. The UB control is used to optimally control data transports between the peripheral memory and the UB buffer and it implements the actual data processing (for instance internal sorting or join operation) of the data in the buffer.

Accordingly the UB buffer is needed for two tasks:

1. Input of all regions cutting a slab zone,
2. Buffering those portions of the input jump regions not in the slab instantaneously processed and which must therefore be "undone" until the slab in which they are located shall be processed.

Accordingly the tasks for the UB control are the following:

1. Determining optimal slab partitioning for F,
2. Controlling the data transports from the peripheral memory into the UB buffer,
3. Internal sorting in the UB buffer of the data in the input regions. For this purpose standard sorting procedures for internal sorting are used, for instance Heapsort or Quicksort,
4. Output, in the desired sorting sequence, of the data within the instantaneous slab zone,
5. Managing those portions of the jump regions which shall be needed for subsequent slab processing.

The following applies to an algorithm of high programming level for the general case of the method of the invention to read and ready data in an arbitrary sorting sequence:

Let a given multi-dimensional stock of data F be sub-divided k-fold, that is, there are $n=2^k$ slabs from 1 to n and per slab there are also n sub-cubes and therefore at most 2n jump regions. The ith slab of the stock of data F being denoted FS(i).

UB buffer:=empty

```
for i: = 1 to n do
    begin co process ith slab oc
        for all regions r in the UB buffer do
            begin if r cuts FS(i) then
                begin process data in r (in particular: sort
```

-continued

```
                them internally in the UB buffer);
                if r is completely processed
                then erase r from UB buffer
            end
        end;
        for all regions r cutting FS(i) but were not
            yet in the UB buffer do
            begin read r from hard disk;
                co here FS(i) is considered as if it were a Query Box for the
UB
                tree oc
                process data from the intersection of r with FS(i);
                if r is a jump region
                then store r in UB buffer
            end;
            co now all data from FS(i) are in the UB buffer ready and
in          sorting sequence oc
            process data in FS(i) in sorting sequence for instance
printing            them, displaying them on the monitor, or in the event
of relations        process further using relational algebra
        end
        co after the last slab has been processed, the UB buffer must be empty
            because no jump region can jump beyond the last slab in F oc.
```

If F is sub-divided into slabs of width 1/n, the required size of the UB buffer for processing F into sorting sequence in the two-dimensional case is given by:

$$B(F, n) = |F|/n + 2*n|P|$$

$|F|/n$ is needed for the slab itself, $2*n*|P|$ for the jump regions, where $|F|$ is the magnitude of F and $|P|$ is the magnitude of one page of data in bytes.

This buffer size is minimal when the derivation with respect to n becomes zero, that is for $$B'(F,n) = -1*|F|/n^2 + 2*|P| = 0,$$

with the optimal size $n_{opt}$ for n being $n_{opt}$=root of $(|F|/[2*|P|])$.

Approximately k is selected next so that $n = 2^k$ is as close as possible to $n_{opt}$ and thereby becomes a nearly optimal size for the UB buffer.

The following mathematical illustration concerns the required memory sizes:
$|F| = 10^9$ bytes, $|P| = 10^3$ bytes
$n_{opt}$=root of $(10^9/[2*10^3]) = 707$
Selecting k=10 and hence n=1024, B(F, 1024)=3 Mb
Selecting k=9 and hence n=512, B(F, 512)=3 Mb.

The precise optimum thus would be B(F, 707)=$10^9$/707+ $2*707*10^3$=2.82 Mb,

This example also shows that B(F, n) has a very flat minimum and is fairly insensitive to the precise selection.

In the general d-dimensional case, the size of the UB buffer required for processing F in the sorting sequence is given by $$B(F,n,d) = |F|/n + 2*n^{d-1}*|P|,$$

$|F|/n$ being required for the sub-space itself (the slab), and $2n^{d-1}*|P|$ for the jump regions.

This buffer size will be minimum when the derivation with respect to n becomes zero, namely when $$B'(F, n, d) = -1*|F|/n^2 + 2*(d-1)*n^{d-2}|P| = 0$$

with the optimal magnitude $n_{opt}$ for n being given by $$n_{opt} = d\text{th root } (|F|/[2*(d-1)*|P|]).$$

Accordingly the UB cache of the invention is especially advantageous to implement a join operation.

For efficient implementation, most relational algebra operations require that at least one, or also both operands (relations) be present in sorting order as defined by specific attributes. As already discussed above, the relations must therefore be sorted very frequently in conventional databases. Multiple to-and-for data transport between the computer main memory and the hard disk is involved. In the invention however using the UB cache method, stocks of data organized as a UB tree can be read and processed in such manner as if they were sorted on the hard disk. Accordingly the UB cache method avoids the heretofore required sorting procedures. As a result, the above mentioned data transports—for sorting purposes—between the main memory and the hard disk can be avoided and the relational algebra operations can be carried out at significantly higher speeds. Therefore the UB cache method allows substantially accelerating relational operator implementation in all relational databases. Some relational algebra operations are used similarly also in other database systems, for instance in object-oriented database systems. These operations as well can be correspondingly accelerated using the UB cache method of the invention.

As regards the state of the art, for instance in a join operation between two relations R and S, the following processing stages are conventionally used:

1. read R relation from hard disk
2. pre-sort R in portions
3. enter R by portions on hard disk
4. again read R by portions from hard disk
5. sort R using a so-called mixing procedure
6. enter R on the hard disk
7. if S has not yet been sorted according to the join attribute, the steps 1 through 6 now must be appropriately also be carried out for S; the steps 1 through 7 are preparatory for the actual join operation,
8. read S by portions in sorting sequence from the hard disk
9. read R by portions in sorting sequence from the hard disk and join to the pertinent tuples from S (join operation proper)
10. enter the join result on the hard disk.

Steps 4, 5, 6 are carried out at least once, and several times in many sorting procedures. Therefore R will be read at least a total of three times from the hard disk (in steps 1, 4, 6) and will be entered three times on the hard disk (steps 3, 6, 10 because the join result contains data from R and S). Just as R, S also will be read three times from the hard disk and will be entered on it three times. The just described join procedure is also known in the literature as "sort-merge-join".

When the relation R is appropriately organized as a UB tree, R can only be read using the UB cache method in such manner as if R had been sorted on the hard disk. The same conditions apply appropriately to S. As a result the steps 1 through 7 are eliminated from the above join method. As a result the total join method is accelerated by a factor of at least 3.

Because in most relational algebra operations (besides the join operation, which however is the most important one) the participating relations must be read in sorted form (and therefore, in the heretofore conventional procedures must first be sorted) such sorting procedures are eliminated using the UB cache method jointly with the UB tree and the operations can be speeded up substantially.

The function of a join algorithm of the invention with the UB cache method is elucidated below in relation to FIG. 3.

1. the UB control optimizes the buffer size and automatically determines $n_{opt}$; in the example, it is assumed that $n_{opt}=n=8$,
2. next a relation R organized as a UB tree is sub-divided into portions of size 1/n where $n=2^k$, and in this example therefore k=3; in the two-dimensional case these portions are rows; these rows are numbered 1 through n,
3. after the space has been sub-divided k-fold, there will be n sub-cubes in one row, in this instance 8 squares,
4. as regards the join operation, next an S row is fed in entirety into the UB buffer (corresponding to step 8 in the previously described sort-merge-join); if S is organized as a B tree or is suitably sorted, exactly one row can be fed from the peripheral memory into the UB buffer; (if S is organized as a UB tree, the zone of rows will be fed in sorted manner, the projecting portions of the jump regions being stored in the UB buffer for subsequent uses),
5. next the relation R is processed row by row in order for instance to join the tuples in this row with the matching tuples from the corresponding S row (corresponding to step 9 in the above described sort-merge-join); for that purpose those regions of the hard disk are being read which cover the n sub-cubes of a row; because the regions of a UB tree precisely correspond to one side of a hard disk, regions always are moved (read) from the hard disk into the main memory; two cases now arise:
   those regions fully contained in the row can be immediately processed and be joined to their partners of the corresponding S row, that is, they need not be buffered,
   those regions which project beyond the row into rows (jump regions) to be processed later contain two kinds of data: those within the row being processed (intra-row data) and those outside this row (extra-row data); the intra-row data can be processed at once and be joined to their partners of the corresponding S row, while the extra-row data are buffered and stored in the UB buffer until subsequently processing the row in which they are located.

It is important in this respect to know the number of jump regions maximally possible in order to estimate the memory needs for buffering R jump regions or at least their row-extra data in the UB buffer. It is assumed for simplicity that the jump regions all are buffered. By splitting into row-intra and row-extra data, the memory required by R in the UB buffer may be further reduced by about half because in reality only the R extra-row data need be buffered.

The size of the UB buffer for the join method then follows:
Case 1: let S be appropriately sorted and let B be organized as a UB tree:
   to sort a full S row: $|S|/n$ bytes
   to store the jump regions of the R row: $2*n*|P|$ bytes
   total requirement: $B1(S,n)=|S|n+2*n*|P|$ bytes.
   The optimum is given by $B1'(2,n)=-|S|/n^2+2*|P|=0$ and accordingly $$n_{opt}=\text{root}(|S|/[2*|P|]).$$

Case 2: Neither relation R or S is appropriately sorted, but they are organized as UB trees,
   to store the full S row and store this row's jump regions:

$$|S|/n+2*n|P| \text{ bytes}$$

to store jump regions of R row: $2*n*|P|$ bytes
   total requirement: $B2(S, n)=|S|/n+4*n*|P|$ bytes.
   Optimum exists at $B2'(S,n)=-|S|/n^2+4|P|=0$, whence $$n_{opt}=\text{root }(|S|/[4*|P|]).$$

The concept of the invention reflected in the claims also includes using the database system of the invention and the UB cache method of the invention in further operations of relational algebra, for instance projections, merging quantities etc.

What is claimed is:

1. Database system comprising:
   a computer unit;
   a main memory and another memory storing at least one multi-dimensional stock of data in the form of a UB tree;
   the UB tree is sub-divided into a predetermined number of sub-spaces and the sub-spaces are consecutively processed to read and ready the stock of data in an arbitrary sorting sequence; and
   a cache storage to buffer UB-tree regions (jump regions) cutting the sub-space being processed until the jump region(s) in the subsequent sub-spaces have been completely processed.

2. Database system as claimed in claim 1, wherein a join operation is carried out between the UB tree and at least one further join partner by sub-dividing the join partner into a number of sub-spaces corresponding to the number of UB tree sub-spaces and by consecutively processing the particular sub-spaces while joining partial stocks of data of the join partners.

3. Database system as claimed in claim 1, and further comprising a control unit to implement the default number and/or the default of sub-spaces width.

4. Database system as claimed in claim 3, wherein the control unit is part of the computer unit.

5. Database system as claimed in claim 1, wherein a sub-space width default is a minimizing function of the storing capacity of the cache storage.

6. Database system as claimed in claim 1, wherein the sub-division is implemented into sub-spaces of identical widths.

7. A method for running a database system to read data in an arbitrary sorting sequence, comprising:
   a) sub-dividing a multi-dimensional stock of data stored in the form of a UB tree into a predetermined number of n sub-spaces, b) feeding the data from the first sub-space of the UB tree into a main memory, c) processing by region (sorting and/or readying) the data of the sub-space, d) erasing those regions in the main memory lacking any cut sets with subsequent sub-spaces, e) buffering those regions in a cache storage which comprise a cut set with at least one of the ensuing sub-spaces (jump regions), f) feeding the next sub-space of the stock of data into the main memory, g) repeating the method steps c) through f) until the last sub-space has been processed, where, as regards each new sub-space first the jump regions buffered in the cache storage are processed and will be erased in case they do not cut further sub-spaces.

8. A method to implement a join operation between at least two join partners, at least one join partner being a multi-dimensional stock of data stored as a UB tree, comprising:

a) sub-dividing the join partners into n sub-spaces, b) feeding the data from a first sub-space in a first join partner into a main memory, c) inputting the data from a first region of the first sub-space of a second join partner stored in the form of a UB tree, d) processing (find and assign) the join partner data in the main memory, e) erasing the region in the main memory in case this region lacks a cut set in the main memory with at least one of the following sub-spaces of the UB tree, otherwise buffering the region (jump region) in a cache storage, f) feeding the next region of a second join partner into the main memory, g) repeating method steps d) through f) until the last region of the first sub-space of the second join partner has been processed, h) inputting the next sub-space of the first join partner and region by region input of the next sub-space of the second join partner, i) repeating the method steps d) through h) until the last sub-space has been processed, where, for each new sub-space, first the jump regions buffered in the cache storage are processed and, in case they do not cut further sub-spaces, they will be erased.

9. Method as claimed in claim 8, wherein at least that portion of a jump region which has not yet been processed is stored in the cache storage.

10. Method as claimed in claim 8, wherein the number n of the sub-spaces obeys the condition $n=2^k$, where k is the number of sub-divisions of UB tree's stock of data.

11. Database system as claimed in claim 1, wherein the another memory is a peripheral memory.

* * * * *